United States Patent
Mitsui et al.

(10) Patent No.: US 10,409,150 B2
(45) Date of Patent: Sep. 10, 2019

(54) IMAGE PROJECTION STRUCTURE, TRANSPARENT SCREEN, AND MANUFACTURING METHOD OF IMAGE PROJECTION STRUCTURE

(71) Applicant: AGC Inc., Chiyoda-ku (JP)

(72) Inventors: Yoko Mitsui, Chiyoda-ku (JP); Yukihiro Tao, Chiyoda-ku (JP); Hitoshi Tsuchiya, Chiyoda-ku (JP); Yasushi Kawamoto, Chiyoda-ku (JP); Atsushi Komori, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/184,310

(22) Filed: Nov. 8, 2018

(65) Prior Publication Data

US 2019/0079379 A1 Mar. 14, 2019

Related U.S. Application Data

(63) Continuation of application No. PCT/JP2017/017196, filed on May 1, 2017.

(30) Foreign Application Priority Data

May 13, 2016 (JP) .................... 2016-097450
Feb. 3, 2017 (JP) .................... 2017-018789

(51) Int. Cl.
*G03B 21/60* (2014.01)
*B32B 27/00* (2006.01)
(Continued)

(52) U.S. Cl.
CPC ........... *G03B 21/60* (2013.01); *B32B 3/30* (2013.01); *B32B 7/12* (2013.01); *B32B 27/00* (2013.01);
(Continued)

(58) Field of Classification Search
CPC ........................................ G03B 21/56
(Continued)

(56) References Cited

U.S. PATENT DOCUMENTS 4,078,030 A * 3/1978 Munk .............. B27N 5/00
 264/109
4,732,456 A * 3/1988 Fergason .......... G02F 1/1334
 349/113
(Continued)

FOREIGN PATENT DOCUMENTS

JP 2003-255126 9/2003
JP 2005-70240 3/2005
(Continued)

OTHER PUBLICATIONS

International Search Report dated Aug. 8, 2017 in PCT/JP2017/017196, filed on May 1, 2017 (with English Translation).
(Continued)

*Primary Examiner* — Clayton E. LaBalle
*Assistant Examiner* — Kevin C Butler
(74) *Attorney, Agent, or Firm* — Oblon, McClelland, Maier & Neustadt, L.L.P.

(57) ABSTRACT

An image projection structure includes a first transparent layer having an irregular surface; a reflection layer arranged on the irregular surface of the first transparent layer; an adhesion layer arranged on the reflection surface; and a second transparent layer arranged on the adhesion layer.
The adhesion layer is configured of linear polymers with a mold shrinkage factor of less than 3%.
The second transparent layer is configured of a resin having a cross-linking structure.

20 Claims, 5 Drawing Sheets

(51) Int. Cl.
*B32B 27/16* (2006.01)
*B32B 3/30* (2006.01)
*G02B 5/02* (2006.01)
*G02B 5/08* (2006.01)
*B32B 7/12* (2006.01)
*B32B 37/12* (2006.01)
*B32B 38/00* (2006.01)
*G03B 21/56* (2006.01)
*G03B 21/62* (2014.01)
*G03B 21/625* (2014.01)
*G03B 21/58* (2014.01)

(52) U.S. Cl.
CPC ............ *B32B 27/16* (2013.01); *B32B 37/12* (2013.01); *B32B 38/0012* (2013.01); *G02B 5/02* (2013.01); *G02B 5/08* (2013.01); *B32B 2551/00* (2013.01); *G03B 21/56* (2013.01); *G03B 21/58* (2013.01); *G03B 21/62* (2013.01); *G03B 21/625* (2013.01)

(58) Field of Classification Search
USPC ........................................................ 359/443
See application file for complete search history.

(56) References Cited

U.S. PATENT DOCUMENTS

| | | | | |
|---|---|---|---|---|
| 5,337,179 | A * | 8/1994 | Hodges | B29D 11/0073 359/443 |
| 6,160,655 | A * | 12/2000 | Fix | G02F 1/1335 349/16 |
| 2004/0169789 | A1 * | 9/2004 | Mathey | G02F 1/133509 349/86 |
| 2009/0067057 | A1 * | 3/2009 | Sprague | G02B 27/0101 359/630 |
| 2011/0256350 | A1 * | 10/2011 | Ito | G02B 5/045 428/156 |
| 2014/0104690 | A1 * | 4/2014 | Sandre-Chardonnal | B32B 17/10 359/599 |
| 2015/0138627 | A1 * | 5/2015 | Ehrensperger | G03B 21/60 359/315 |
| 2015/0138628 | A1 * | 5/2015 | Guiset | G03B 21/60 359/318 |
| 2015/0301366 | A1 * | 10/2015 | Gayout | B32B 17/10504 349/86 |
| 2017/0052295 | A1 * | 2/2017 | Sakuma | B32B 7/02 |
| 2017/0082915 | A1 * | 3/2017 | Tao | G02B 5/02 |

FOREIGN PATENT DOCUMENTS

| | | |
|---|---|---|
| JP | 2007-177002 | 7/2007 |
| JP | 5296791 | 9/2013 |
| JP | 2014-509963 | 4/2014 |
| JP | 2015-210319 | 11/2015 |
| JP | 2016-9271 | 1/2016 |
| JP | 2016-53742 | 4/2016 |
| WO | WO 2015/186668 A1 | 12/2015 |

OTHER PUBLICATIONS

Written Opinion dated Aug. 8, 2017 in PCT/JP2017/017196, filed on May 1, 2017.

* cited by examiner

IMAGE PROJECTION STRUCTURE, TRANSPARENT SCREEN, AND MANUFACTURING METHOD OF IMAGE PROJECTION STRUCTURE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/017196 filed on May 1, 2017 and designating the U.S., which is based on and claims priority to Japanese Patent Applications No. 2016-097450 filed on May 13, 2016 and No. 2017-018789 filed on Feb. 3, 2017. The entire contents of the foregoing applications are incorporated herein by reference.

BACKGROUND OF THE INVENTION

1. Field of the Invention

The disclosure herein generally relates to an image projection structure that can be applied to a transparent screen, for example.

2. Description of the Related Art

Transparent screens that can display images in forward directions in a state where a rear background behind the screen can be viewed have attracted attention in various technical fields.

Such transparent screens include, for example, transparent screens of front projection type that project images onto the transparent screen from a viewer's side of the screen, and transparent screens of rear projection type that project images onto the transparent screen from a side of the screen opposite to the viewer.

Among the screens, the transparent screen of the front projection type is configured by arranging a structure for displaying images (in the following, referred to as an "image projection structure") on a surface of a transparent substrate. The image projection structure is configured by arranging a reflection layer on an irregular surface of a first transparent resin layer that has the irregular surface, and further arranging a second transparent resin layer on the reflection layer (See, for example, WO 2015/186668, Japanese Translation of PCT International Application Publication No. JP-2014-509963, and Japanese Patent No. 5296791).

Such transparent screens can take various forms. For example, a transparent screen of a film pasting type can be configured by pasting an image projection structure having a film shape on a transparent substrate. Moreover, a transparent screen of an embedding type can be configured by interposing an image projection structure between two transparent substrates.

A "transparency" of the transparent screen depends on a transmittance of the transparent screen and a haze. That is, as the transmittance of the transparent screen increases and as the haze decreases, a visibility of a rear background is enhanced (but a clearness of images decreases). As the transmittance of the transparent screen decreases and as the haze increases, clear images are displayed (but the visibility of the rear background decreases). In this way, by adjusting the transmittance of the transparent screen and the haze, the "transparency" of the transparent screen can be controlled to some extent.

In particular, recently, substantially "opaque" screens, in which a clearness of displayed images is prioritized over a visibility of a rear background, also have attracted attention. However, in the present application, in order to avoid complication, as long as the aforementioned image projection structure is present, such an "opaque" screen will be also referred to as a "transparent screen".

SUMMARY OF THE INVENTION

Technical Problem

According to knowledge of the inventors of the present application, in the image projection structure used in the aforementioned transparent screen, it is often found that an adhesion force between the reflection layer and the second transparent resin layer is insufficient, and an exfoliation occurs at an interface between the reflection layer and the second transparent resin layer.

The present invention was made in view of the aforementioned problem, and mainly aims at providing an image projection structure in which an exfoliation does not occur easily between the reflection layer and the second transparent resin layer. Moreover, the present invention aims at providing a transparent screen including such an image projection structure. Furthermore, the present invention aims at providing a manufacturing method of such an image projection structure.

Solution to Problem

In the present invention, an image projection structure including a first transparent layer having an irregular surface;

a reflection layer arranged on the irregular surface of the first transparent layer;

an adhesion layer arranged on the reflection surface; and a second transparent layer arranged on the adhesion layer, the adhesion layer being configured of linear polymers with a mold shrinkage factor of less than 3%, and the second transparent layer being configured of a resin having a cross-linking structure, is provided.

Moreover, in the present invention, a transparent screen including at least one transparent substrate; and an image projection structure arranged on a surface of the transparent substrate, the image projection structure being the image projection structure having the aforementioned features, is provided.

Furthermore, in the present invention, a manufacturing method of an image projection structure including a step (1) of preparing a first transparent layer having an irregular surface;

a step (2) of arranging a reflection layer on the irregular surface of the first transparent layer;

a step (3) of coating a coating liquid, in which linear polymers are dissolved in a solvent on the reflection layer, to form a coating layer, and afterwards vaporizing the solvent from the coating layer, to form an adhesion layer configured of the linear polymers; and a step (4) of arranging on the adhesion layer a second transparent layer configured by curing a curable resin composition that forms a cross-linking structure, is provided.

Effect of Invention

In the present invention, an image projection structure, in which an exfoliation does not occur easily between a reflection layer and a second transparent layer, can be provided. Moreover, in the present invention, a transparent screen including such an image projection structure can be provided. Furthermore, in the present invention, a manufacturing method of such an image projection structure can be provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, with reference to drawings, embodiments for implementing the present invention will be described.

(Conventional Transparent Screen)

Figure 1:
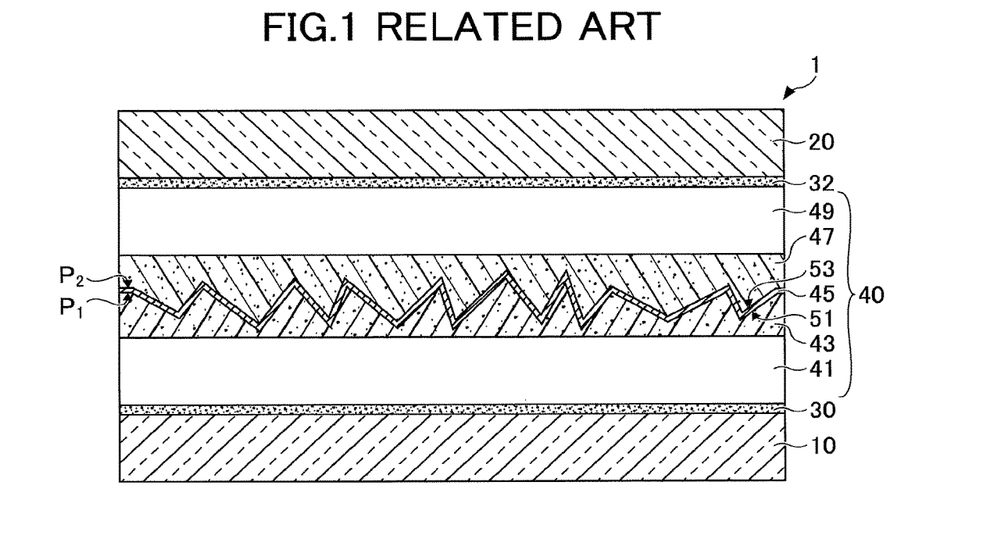
FIG. 1 is a diagram schematically depicting a cross section of a transparent screen of a front projection type according to a related art.

In order to understand the feature of the present invention better, an example of a configuration of a conventional transparent screen will be briefly described with reference to FIG. 1. FIG. 1 schematically illustrates a cross section of a conventional transparent screen of a front projection type (in the following, simply referred to as a "conventional transparent screen").

As illustrated in FIG. 1, the conventional transparent screen 1 is configured by arranging an image projection structure 40 between a first glass substrate 10 and a second glass substrate 20. More specifically, the conventional transparent screen 1 is configured by joining the first glass substrate 10 and the image projection structure 40 via a first adhesion layer 30, and joining the second glass substrate 20 and the image projection structure 40 via a second adhesion layer 32.

The image projection structure 40 includes a first transparent resin layer 43, a reflection layer 45 and a second transparent resin layer 47, in this order.

More specifically, the first transparent resin layer 43 has an irregular surface 51, and the reflection layer 45 is arranged on the irregular surface 51. Because typically the reflection layer 45 is relatively thin, an uppermost surface 53 of the reflection layer 45 has substantially the same irregular shape as the irregular surface 51 of the first transparent resin layer 43. The second transparent resin layer 47 is arranged on the uppermost surface 53 of the reflection layer 45 having an irregular shape.

An interface between the irregular surface 51 of the first transparent resin layer 43 and the reflection layer 45 will be referred to as an interface $P_1$. Moreover, an interface between the second transparent resin layer 47 and the reflection layer 45 will be referred to as an interface $P_2$.

Note that in the example, illustrated in FIG. 1, the image projection structure 40 further includes a first support member 41 and a second support member 49. The first support member 41 is arranged on a surface of the first transparent resin layer 43 on a side opposite to the irregular surface 51. Moreover, the second support member 49 is arranged on a surface of the second transparent resin layer 47 on a side opposite to the surface where the reflection layer 45 is arranged.

In the conventional transparent screen 1 having the aforementioned configuration, the reflection layer 45, having the irregular shape included in the image projection structure 40, functions as a so-called half mirror. That is, the reflection layer 45 can reflect and scatter a part of incident light, and transmit another part of the incident light.

Thus, when an image is projected onto the conventional transparent screen 1 from the front (e.g. on the side of the first glass substrate 10), it becomes possible to project an image in the forward direction in a state where a rear background behind a rear side of the conventional transparent screen 1 (e.g. on the side of the second glass substrate 20) can be viewed.

The inventors of the present application have found that in the conventional transparent screen 1, an adhesion force between the reflection layer 45 of the image projection structure 40 and the second transparent resin layer 47 is often insufficient, and an exfoliation may occur at an interface $P_2$ between the reflection layer 45 and the second transparent resin layer 47. Typically, the exfoliation is visually recognized and may degrade a design property. Moreover, the exfoliation may be minute in a micro-level that cannot be visually recognized. However, even in a case where the micro-level exfoliation occurs, image display characteristics of the conventional transparent screen 1 may be degraded.

Note that detailed reasons why the exfoliation occurs at the interface $P_2$ are unknown at present. However, the following matters are considered.

Typically, in the conventional transparent screen 1, the image projection structure 40 is manufactured by performing the following steps:

A first resin, such as a photosetting resin or a thermosetting resin, is arranged on a first support member 41. Then, a shaping mold having an irregular surface is brought into contact with the first resin before curing. Next, in a state where the shaping mold is pressed onto the first resin, by applying an ultraviolet light or heat, the first resin is caused to cure. Afterwards, by removing the shaping mold, a first transparent resin layer 43 having an irregular surface 51 is formed on the first support member 41.

Next, a reflection layer 45 is deposited on the irregular surface 51 of the first transparent resin layer 43.

Furthermore, on the reflection layer 45, a second resin, such as a photosetting resin or a thermosetting resin, is arranged. Afterwards, by applying an ultraviolet light or heat, the second resin is caused to cure, and thereby a second transparent resin layer 47 is formed from the second resin.

The second resin is provided in a monomer state, and changed by a cross-linking reaction to a second transparent resin layer 47. Generally, a cross-linking reaction is accompanied by a great reduction in volume, i.e. a volume decreases during the reaction. Thus, when the second resin is changed to the second transparent resin layer 47, in a surface direction (plane direction of the first support member 41), a great volume reduction is expected to occur.

In particular, the second resin is arranged on the irregular surface of the reflection layer 45. Thus, when the second resin is contracted according to the cross-linking reaction, the second transparent resin layer 47 cannot follow the irregular shape below the second transparent resin layer 47, and an exfoliation is considered to occur in a part of the interface $P_2$. Adhesiveness at the interface $P_2$ is considered to include a plurality of factors such as a stress concentration of a contraction stress of the second transparent resin on the irregular surface of the interface $P_2$, the balance of the adhesive force of the interface $P_2$, and an anchoring effect according to the irregular surface.

(Image Projection Structure According to Embodiment of Present Invention)

Figure 2:
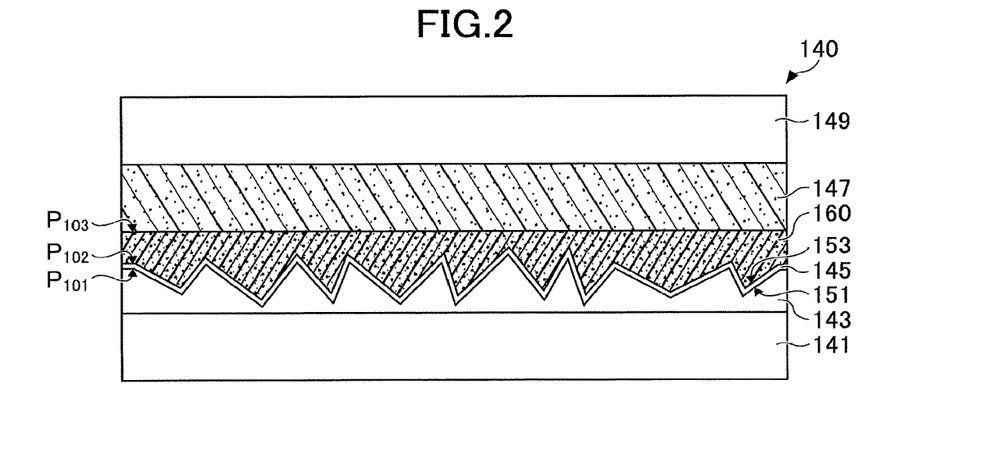
FIG. 2 is a diagram schematically depicting an example of a cross section of an image projection structure according to an embodiment of the present invention.

Next, with reference to FIG. 2, a configuration example of an image projection structure according to an embodiment of the present invention will be described. FIG. 2 schematically illustrates an example of a cross section of an image projection structure according to the embodiment of the present invention (in the following, referred to as a "first image projection structure").

As illustrated in FIG. 2, the first image projection structure 140 includes a first transparent layer 143, a reflection layer 145, and a second transparent layer 147, in this order. Moreover, the first image projection structure 140 further includes an adhesion layer 160 between the reflection layer 145 and the second transparent layer 147.

The first transparent layer 143 has an irregular surface 151, and the reflection layer 145 is arranged on the irregular surface 151. As described above, because the reflection layer 145 is relatively thin, an uppermost surface 153 of the reflection layer 145 has substantially the same (conformal) irregular shape as the irregular surface 151 of the first transparent layer 143.

The adhesion layer 160 is arranged on the uppermost surface 153 of the reflection layer 145 so as to substantially fill a recessed portion of the reflection layer 145. Thus, the uppermost surface of the adhesion layer 160 is smoother compared with the surface of the reflection layer 145 side. The adhesion layer 160 is configured of linear polymers.

The second transparent layer 147 is arranged on the relatively smooth surface of the adhesion layer 160. Moreover, the second transparent layer 147 is configured of a resin having a cross-linking structure. Thus, a cure shrinkage factor of the second transparent layer 147 is greater than a cure shrinkage factor of the adhesion layer 160 that is configured of linear polymers.

In the following, an interface between the irregular surface 151 of the first transparent layer 143 and the reflection layer 145 will be referred to as a first interface $P_{101}$. Moreover, an interface between the reflection layer 145 and the adhesion layer 160 will be referred to as a second interface $P_{102}$. Furthermore, an interface between the adhesion layer 160 and the second transparent layer 147 will be referred to as a third interface $P_{103}$.

In the example illustrated in FIG. 2, the first image projection structure 140 further includes a first support member 141 and a second support member 149. The first support member 141 is arranged on a surface of the first transparent layer 143 on a side opposite to the irregular surface 151. Moreover, the second support member 149 is arranged on a surface of the second transparent layer 147 on a side opposite to the surface near the adhesion layer 160.

The first support member 141 and the second support member 149 have a role of supporting the first image projection structure 140 and facilitating handling of the first image projection structure 140. For example, in the case where the first support member 141 and the second support member 149 are absent, typically a thickness of the first image projection structure 140 is approximately 50 μm to 300 μm, and an obtained rigidity is poor. However, by providing the first support member 141 and/or the second support member 149, a sufficient rigidity can be obtained, and the handling becomes easier.

However, in a particular case, such as where a great rigidity is not required for the first image projection structure, either one of the first support member 141 and the second support member 149 may be omitted.

The first image projection structure 140 has a feature that the adhesion layer 160 is present between the reflection layer 145 and the second transparent layer 147. A mold shrinkage factor in the formation of the adhesion layer 160 has a feature of being less than the cure shrinkage factor of the second transparent layer. The mold shrinkage factor means a factor of reduction of a volume of the adhesion layer 160 due to drying or polymerization in the process of forming the adhesion layer 160 on a surface of the reflection layer 145 (calculated as (length after shrinkage)/(length before shrinkage)×100).

For example, in the case where the adhesion layer is a polymer formed by polymerizing on the surface of the reflection layer 145, the mold shrinkage factor can be obtained as (specific weight before polymerization−specific weight after polymerization)×100/(specific weight after polymerization).

Moreover, in the case where the adhesion layer is an application liquid which is obtained by dissolving or suspending a polymer in a solvent, the mold shrinkage factor is obtained by the following method.

On a smooth PET film, the application liquid is applied so that a length falls within a range of 20 mm to 100 mm, and a thickness after drying falls within a range of 20 μm to 100 μm, and a length of application immediately after the application is measured. After drying the applied liquid, a length after drying is measured. From the obtained results, the mold shrinkage factor can be obtained by using (length immediately after application−length after drying)×100/(length immediately after application).

In the case where such an adhesion layer 160 is arranged between the reflection layer 145 and the second transparent layer 147, when the second transparent layer 147 is formed of a curable resin composition for the second transparent layer 147, even if a volume reduction due to a cross-linking reaction occurs in the curable resin composition, the influence can be mitigated by the adhesion layer 160.

In particular, the second transparent layer 147 is arranged on a relatively smooth surface of the adhesion layer 160, not an irregular surface such as an uppermost surface 153 of the reflection layer 145. Thus, even if volume reduction occurs in the second transparent layer 147 in the cross-linking reaction of the curable resin composition, the second transparent layer 147 can follow a surface shape of a base material, and make a stress concentration unlikely to occur. Moreover, because the adhesion layer 160 is configured of a linear polymer, even if a volume reduction of the second transparent layer 147 occurs, a shrinkage stress at the third interface $P_{103}$ is mitigated easily. Thus, an exfoliation at the third interface $P_{103}$ can be prevented from occurring significantly.

Moreover, because the adhesion layer 160 itself is configured of a linear polymer with a mold shrinkage factor upon forming of less than 3%, an occurrence of the volume reduction upon formation is suppressed. Thus, an exfoliation is unlikely to occur on the second interface $P_{102}$, when the adhesion layer 160 is formed on the uppermost surface 153 of the reflection layer 145.

According to the effects described as above, an excellent adhesiveness can be obtained in both the second interface $P_{102}$ and the third interface $P_{103}$, in the first image projection structure 140.

As a result, in the first image projection structure 140, in the first image projection structure 140, an exfoliation between the reflection layer 145 and the second transparent layer 147 can be prevented from occurring significantly.

Note that a water absorption rate of the adhesion layer 160 is preferably low. Specifically, the water absorption rate is preferably less than 0.8%. In the case where the water absorption rate falls within the aforementioned range, adhesiveness between the reflection layer 145 and the adhesion layer 160 is enhanced.

The water absorption rate of the adhesion layer 160 is more preferably less than 0.3%, and further preferably less than 0.1%.

(Another Image Projection Structure According to the Embodiment of the Present Invention)

Figure 3:
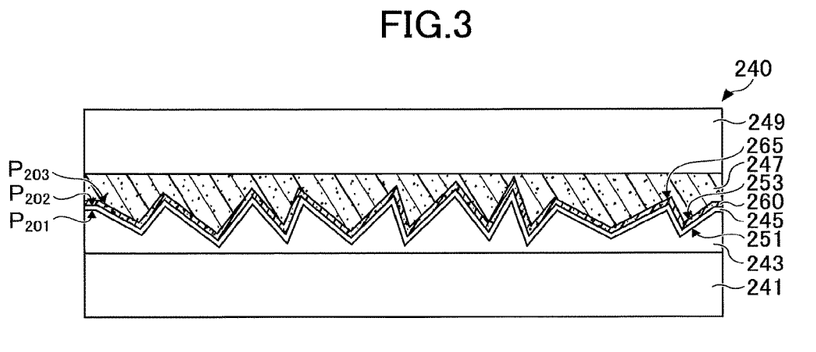
FIG. 3 is a diagram schematically depicting another example of the cross section of the image projection structure according to the embodiment of the present invention.

Next, with reference to FIG. 3, an example of the configuration of another image projection structure according to the embodiment of the present invention will be described. FIG. 3 is a diagram schematically depicting an example of a cross section of another image projection structure according to the embodiment of the present invention (in the following, will be referred to as a "second image projection structure").

As illustrated in FIG. 3, the second image projection structure 240 fundamentally has almost the same configuration as the aforementioned first image projection structure 140. That is, the second image projection structure 240 includes a first transparent layer 243, a reflection layer 245, an adhesion layer 260, and a second transparent layer 247, in this order. A first interface $P_{201}$ is present between the first transparent layer 243 and the reflection layer 245. A second interface is $P_{202}$ present between the reflection layer 245 and the adhesion layer 260. A third interface $P_{203}$ is present between the adhesion layer 260 and the second transparent layer 247.

Moreover, a first support member 241 is arranged on a side opposite to an irregular surface 251 of the first transparent layer 243, and a second support member 249 is arranged on a side opposite to the adhesion layer 260 of the second transparent layer 247. Note that these support members 241 and 249 may be omitted.

However, in the second image projection structure 240, the adhesion layer 260 is, differently from the case of the first image projection structure 140, arranged on an uppermost surface 253 of the reflection layer 245 having an irregular shape, in a state of a thin film. In other words, the adhesion layer 260 is formed so as to have an irregular surface 265 that corresponds to the irregular shape of the uppermost surface 253 of the reflection layer 245. As a result, the second transparent layer 247, arranged on the adhesion layer 260, is formed so as to have a surface having an irregular shape on a side of the adhesion layer 260. That is, an interface between the adhesion layer 260 and a second transparent layer 247 (third interface $P_{203}$) has an irregular shape.

According to the inventors of the present application, it is confirmed that even in the second image projection structure 240 having the aforementioned configuration, the same effect as the above-described first image projection structure 140 can be obtained. That is, according to the adhesion layer 250, in both of the second interface $P_{202}$ and the third interface $P_{203}$, exfoliation between adjacent members can be prevented from occurring significantly, and an exfoliation between the reflection layer 245 and the second transparent layer 247 can be prevented from occurring significantly.

As described above, with reference to FIGS. 2 and 3, examples of configurations of the image projection structure according to the embodiment of the present invention have been described. However, the above description is simply an example, and the image projection structure according to the present invention may have other different configurations.

(Detail of Each Configuration Member)

Next, each member configuring the image projection structure according to the embodiment of the present invention will be described in more detail.

Note that, in the following, each configuration member of the first image projection structure 140, illustrated in FIG. 2, will be described, as an example. Thus, when each member is indicated, the reference numeral shown in FIG. 2 will be used.

(First Transparent Layer 143)

A transparent material of the first transparent layer 143 is not particularly limited, as long as an irregular shape can be formed on a surface. For example, the first transparent layer 143 may be configured of a transparent resin. The resin material includes, for example, a photosetting resin, such as an acrylic resin or an epoxy resin, a thermosetting resin, or a thermoplastic resin.

An arithmetic average roughness Ra of the irregular surface 151 of the first transparent layer 143 may fall within a range of 0.01 μm to 20 μm. The arithmetic average roughness Ra preferably falls within a range of 0.01 μm to 20 μm.

Moreover, in the irregular surface 151 of the first transparent layer 143, a difference between a maximum height and a minimum height (referred to as a "maximum PV value") may fall within a range from 0.1 μm to 50 μm. The maximum PV (peak-to-valley) value preferably falls within a range from 0.05 μm to 50 μm.

A transmittance of the first transparent layer 143 is preferably 50% or more, more preferably 75% or more, and further preferably 90% or more.

A thickness of the first transparent layer 143 (maximum thickness) falls, for example, within a range from 0.5 μm to 50 μm.

(Second Transparent Layer 147)

The second transparent layer 147 is, as described above, configured of a resin having a cross-linking structure. The resin includes, for example, a photosetting resin, or a thermosetting resin.

The photosetting resin or the thermosetting resin includes, for example, a cured product of a composition of molecules having unsaturated groups, an epoxy resin, or a silicone resin.

For example, in the case where the second transparent layer 147 is configured of a cured product of a composition of molecules having unsaturated groups, the cured product is preferably a cured resin of a composition including molecules having two or more unsaturated groups per one molecule, or a composition including molecules having two or more unsaturated groups per one molecule and molecules having one unsaturated group per one molecule. An average number of unsaturated groups per one molecule are preferably two or more.

In the case where the second transparent layer 147 is configured of an epoxy resin, the epoxy resin is preferably a cured resin of a one liquid type composition including molecules having three or more epoxy groups per one molecule, or a composition including molecules having three or more epoxy groups per one molecule and molecules having one or two epoxy groups per one molecule. An average number of epoxy groups per one molecule in the one liquid type epoxy resin is preferably three or more.

In the case where the second transparent layer 147 is configured of a silicone resin, the silicone resin is preferably a condensation type silicone resin, in which organosiloxane having three or more alkoxy groups is condensed and cured.

A cure shrinkage factor of the second transparent layer 147 preferably falls within a range from 3% to 20%. When the cure shrinkage factor is 3% or more, a viscosity or a hardness of the second transparent layer 147 is preferable, and easy to be adjusted. When the cure shrinkage factor is 20% or less, an exfoliation is unlikely to occur.

A transmittance of the second transparent layer 147 is preferably 50% or more, more preferably 75% or more, and further preferably 90% or more.

As a resin having the aforementioned features, a photosetting resin is preferable, because the resin can be easily manufactured, and an influence on the other layers is small in a manufacturing process. Particularly, a photo-cured product of a composition of molecules having two or more unsaturated groups on average per one molecule is preferable. The photosetting resin includes, for example, an acrylic resin composition of molecules having two or more unsaturated groups on average per one molecule, or a urethane acrylate. Moreover, the photosetting resin includes a resin with an acrylic equivalent of 50 g/eq to 700 g/eq, and is preferably a resin with an acrylic equivalent of 60 g/eq to 600 g/eq.

The second transparent layer 147 preferably includes a silane coupling agent of 0.5 wt % to 15 wt % with respect to a resin configuring the second transparent layer 147, in order to enhance an adhesiveness between the adhesion layer 160 and the second transparent layer 147. When the content ratio is 0.5 wt % or more, the effect of enhancing the adhesiveness is developed. When the content ratio is 15 wt % or less, a sufficient adhesiveness can be obtained. Even if the content ratio is greater than 15 wt %, the adhesiveness does not change. Thus, the content ratio is preferably 15 wt % or less from the viewpoint of cost.

The silane coupling agent includes, for example, epoxy silanes, such as 2-(3,4-epoxycyclohexyl)ethyltrimethoxysilane, 3-glycidoxypropyltrimethoxysilane, 3-glycidoxypropyltriethoxysilane, or 3-glycidoxypropylmethyldiethoxysilane; (meth)acryloxysilanes, such as 3-methacryloxypropylmethyldimethoxysilane, 3-methacryloxypropyltrimethoxysilane, or 3-acryloxypropyltrimethoxysilane; vinylsilanes, such as vinyltrimethoxysilane, or N-2-(N-vinylbenzylaminoethyl)-3-aminopropyltrimethoxysilane; aminosilanes, such as N-(2-aminoethyl)-3-aminopropylmethyldimethoxysilane, N-(2-aminoethyl)-3-aminopropyltrimethoxysilane, N-(2-aminoethyl)-N'-(2-aminoethyl)-3-aminopropyltriethoxysilane, 3-aminopropyltrimethoxysilane, 3-aminopropylmethyldimethoxysilane, N-phenyl-3-aminopropyltrimethoxysilane; isocyanatesilanes, such as 3-isocyanatepropyltrimethoxysilane; 3-ureidopropyltriethoxysilane; 3-mercaptopropyltrimethoxysilane; or 3-chloropropyltrimethoxysilane. The silane coupling agent is preferably selected in consideration of mixability with the resin configuring the transparent layer 147. For example, when the resin configuring the transparent layer 147 is an acrylic resin, (meth)acryloxy silanes or vinyl silanes are preferable. When the resin configuring the transparent layer 147 is an epoxy resin, epoxy silanes are preferable.

A thickness of the second transparent layer 147 (maximum thickness) falls, for example, within a range from 0.01 µm to 50 µm.

(Reflection Layer 145)

The reflection layer 145 is configured so as to have a function of reflecting a part of incident light, and transmitting another part of the incident light. Note that the reflection layer 145 is not necessarily a single layered film, and may have a multilayer structure.

For example, the reflection layer 145 may be configured of a metal (including an alloy), a metal oxide, a metal nitride, or a combination thereof. The metal includes aluminum (Al), silver (Ag), or an alloy thereof (e.g. an alloy of gold and silver). Moreover, the metal oxide and the metal nitride are preferably an oxide and a nitride of a metal selected from group III elements to group XVI elements in the periodic table. Moreover, among the aforementioned oxides and nitrides, an oxide and a nitride of one or more elements selected from Zr, Ni, Cr, Ti, Zn, Nb, Pd, In, W, Si and Mo, are more preferable.

Alternatively, the reflection layer 145 may have a repeated structure of a metal film and an oxide film. In this case, a thickness of one metal film and one oxide film falls within a range of, for example, 1 nm to 100 nm. For example, the thickness preferably falls within a range of 4 nm to 25 nm.

A thickness of the reflection layer 145 (a total thickness, in the case of a multilayer film) falls, for example, within a range of 1 nm to 150 nm. The thickness falls preferably within a range of 2 nm to 150 nm, more preferably within a range of 5 nm to 80 nm, and further preferably 5 nm to 50 nm. When the thickness falls within the aforementioned range, it becomes easy to set the visible light transmittance high.

(Adhesion Layer 160)

The adhesion layer 160 is, as described above, configured of linear polymers. Moreover, the mold shrinkage factor upon forming the adhesion layer 160 is less than the cure shrinkage factor upon forming the second transparent layer 147.

The adhesion layer 160 may be configured of a resin selected from, for example, an acrylic resin (water absorption rate is 0.3%), a polyester resin (water absorption rate is 0.1%), a polyurethane resin, a polyurethane acrylate resin, a polycarbonate resin (water absorption rate is 0.15%), a polyvinyl butyral resin, a cycloolefin resin polymer, a cycloolefin copolymer resin, and an ethylene-vinyl acetate copolymer resin and the like.

Note the term "linear" means that a main chain is arranged linearly, and does not limit a presence or absence of a side chain. Moreover, the polymer configuring the adhesion layer 160 may include a cross-linking structure within a range of the effect of the present invention being not damaged.

The cycloolefin resin polymer includes, for example, a polymer expressed by the following chemical structural formula a or b. In the present invention, at least one of the groups $R^1$ and $R^2$ or an additive preferably includes a functional group that reacts with a metal and a metal oxide, such as an alkoxyl group, an isocyanate group, an epoxy group, a silanol group, a carbonyl group, an amino group, or a hydroxyl group. The adhesion layer 160 with the above-described structure has adhesiveness to a reflection film, while securing hydrophobicity according to a cycloolefin main frame.

cycloolefin copolymer resin, a polyester resin, and the like. These resins may be provided in a form of film.

In the first support member 141, preferably a double refraction does not occur.

A thickness of the first support member 141 falls within a range of, for example, 0.01 mm to 10 mm. The thickness falls preferably within a range of 0.05 mm to 5 mm, more preferably within a range of 0.1 mm to 0.5 mm, and further preferably within a range of 0.1 mm to 0.3 mm.

What applies to the first support member 141 may be similarly applied to the second support member 149.

Note that, as described above, at least one of the first support member 141 and the second support member 149 may be omitted.

[Chemical 1]

As long as the adhesion layer 160 can sufficiently fill the recessed portions of the reflection layer 145, a thickness of the adhesion layer 160 is not limited particularly. The thickness of the adhesion layer 160 falls within a range of, for example, 0.1 μm to 50 μm. The thickness preferably falls within a range of, for example, 1 μm to 10 μm. When the adhesion layer 160 has the configuration illustrated in FIG. 3, the thickness of the adhesion layer 160 falls within a range of, for example, 0.01 μm to 1 μm.

Note that when the reflection layer 145 includes silver (Ag), the adhesion layer 160 preferably does not include chloride ions to the extent possible. In the case where the adhesion layer 160 includes chloride ions, silver (Ag) in the reflection layer 145 may react with chloride ions, and the reflection layer 145 may be degraded. A concentration of the chloride ions included in the adhesion layer 160 is, for example, less than 10 μg/g, and preferably substantially zero.

(First Support Member 141/Second Support Member 149)

The first support member 141 may be configured of any material as long as the material is transparent. The first support member 141 may be configured of, for example, a glass or a resin.

The glass configuring the first support member 141 is, for example, a soda lime glass, or an alkali-free glass. The glass may be subjected to a chemical strengthening or a hard coat treatment, in order to enhance durability.

The resin configuring the first support member 141 is a polycarbonate resin, a PET (polyethylene terephthalate), a PEN (polyethylene naphthalate, a cycloolefin resin, a (First Projection Structure 140)

A first image projection structure 140, including the first support member 141 and/or the second support member 149, may have a transmittance that falls within a range of 30% to 85%, and a haze that falls within a range of 1% to 15%.

Alternatively, the first image projection structure 140 provided with the first support member 141 and/or the second support member 149 has a transmittance that falls within a range of 0.1% to 10% and a haze that is 30% or more. When such a first image projection structure 140 is applied to a transparent screen, the transparent screen can be substantially opaque, but can display sharp images.

As described above, with the first image projection structure 140 illustrated in FIG. 2, as an example, each configuration member was described. However, a person skilled in the art will comprehend that the above description can be similarly applied to each of the configuration members of the second image projection structure 240, illustrated in FIG. 3.

(Transparent Screen According to the Embodiment of the Present Invention)

Next, with reference to FIG. 4, a configuration example of a transparent screen according to the embodiment of the present invention will be described. Note that the transparent screen, described as follows, is a transparent screen of the front projection type.

Figure 4:
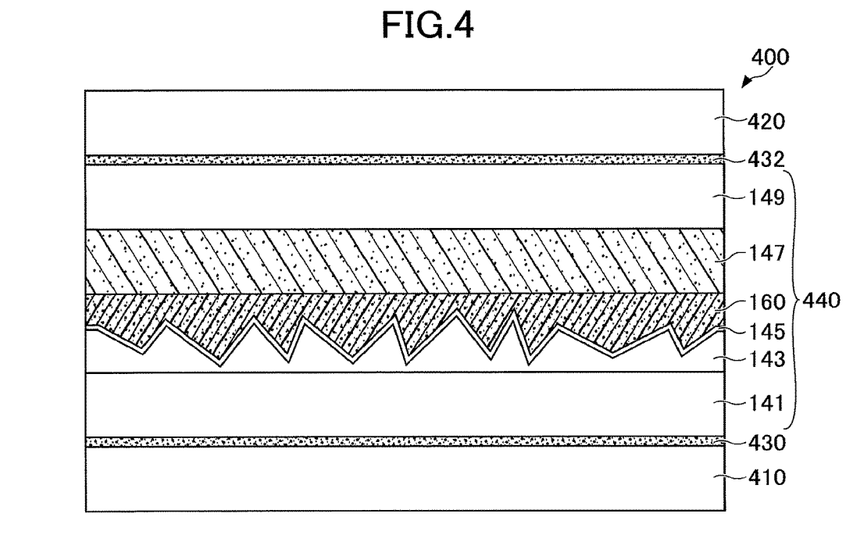
FIG. 4 is a diagram schematically depicting an example of a cross section of a transparent screen according to the embodiment of the present invention.

FIG. 4 is a diagram schematically depicting an example of a cross section of the transparent screen according to the embodiment of the present invention (in the following, referred to as a "first transparent screen").

As illustrated in FIG. 4, the first transparent screen 400 includes a first transparent substrate 410, a second transparent substrate 420, and an image projection structure 440 arranged between the first transparent substrate 410 and the second transparent substrate 420.

The first transparent substrate 410 may be configured of, for example, a glass, a resin or a plastic. What applies to the first transparent substrate 410 may be similarly applied to the second transparent substrate 420.

A first bonding layer 430 is arranged between the first transparent substrate 410 and the image projection structure 440, and thus the first transparent substrate 410 and the image projection structure 440 can be joined. Moreover, a second bonding layer 432 is arranged between the second transparent substrate 420 and the image projection structure 440, and thus the second transparent substrate 420 and the image projection structure 440 can be joined.

The first bonding layer 430 is configured of a transparent material, such as a transparent resin. The transparent material includes, for example, a PVB (polyvinyl butyral), an EVA (ethylene-vinyl acetate copolymer) resin, an acrylic adhesive, and other adhesive.

The same applies to the second bonding layer 432.

The image projection structure 440 is configured by the image projection structure according to the embodiment of the present invention. For example, the image projection structure 440 may be the first image projection structure 140, illustrated in FIG. 2. Alternatively, the image projection structure 440 may be the second image projection structure 240, illustrated in FIG. 3.

For example, in the example illustrated in FIG. 4, the image projection structure 440 has the same configuration as the first image projection structure 140, and includes the first support member 141, the first transparent layer 143, the reflection layer 145, the adhesion layer 160, the second transparent layer 147, and the second support member 149, in this order. However, as described above, at least one of the first support member 141 and the second support member 149 may be omitted.

Note that a specification of each of the members configuring the image projection structure 440 is the same as the above-described specification. Thus, detailed explanation will be omitted.

In the first transparent screen 400 having this kind of configuration, according to the adhesion layer 160 arranged between the reflection layer 145 and the second transparent layer 147, an exfoliation between the reflection layer 145 and the second transparent layer 147 can be prevented from occurring.

The first transparent screen 400 may have a transmittance that falls within a range of 28% to 82%, and a haze that falls within a range of 1% to 15%.

Alternatively, the first transparent screen 400 may have a transmittance that falls within a range of 0.1% to 8%, and a haze of 30% or more. In this case, the first transparent screen 400 can be substantially opaque, but can display sharp images.

As described above, with the first transparent screen 400, as an example, the configuration example of the transparent screen according to the embodiment of the present invention has been described.

However, the above-described first transparent screen 400 is merely an example, and the transparent screen according to the present invention may have other configurations.

For example, in the first transparent screen 400, at least one of the first transparent substrate 410 and/or the second transparent substrate 420 may be omitted.

Moreover, in addition to the above-described configuration or separately from the above-described configuration, at least one of the first bonding layer 430 and the second bonding layer 432 may be omitted.

For example, in the configuration where the first support member 141 is omitted, in the case where the first transparent layer 143 of the image projection structure 440 is used as a bonding layer, the first bonding layer 430 can be omitted. Similarly, in the configuration where the second support member 149 is omitted, in the case where the second transparent layer 147 of the image projection structure 440 is used as a bonding layer, the second bonding layer 432 can be omitted.

Note that in the first transparent screen 400, in the case where all of the first transparent substrate 410, the second transparent substrate 420, the first bonding layer 430 and the second bonding layer 432 are omitted, such members correspond to the image projection structure having the first support member 141 and/or the second support member 149.

A transparent screen may be configured by preparing the aforementioned image projection structure in a film shape, and pasting the image projection structure on another transparent body.

(Manufacturing Method of Image Projection Structure According to the Embodiment of the Present Invention)

Next, with reference to FIGS. 5 to 10, an example of a manufacturing method of an image projection structure according to the embodiment of the present invention will be described.

Figure 5:
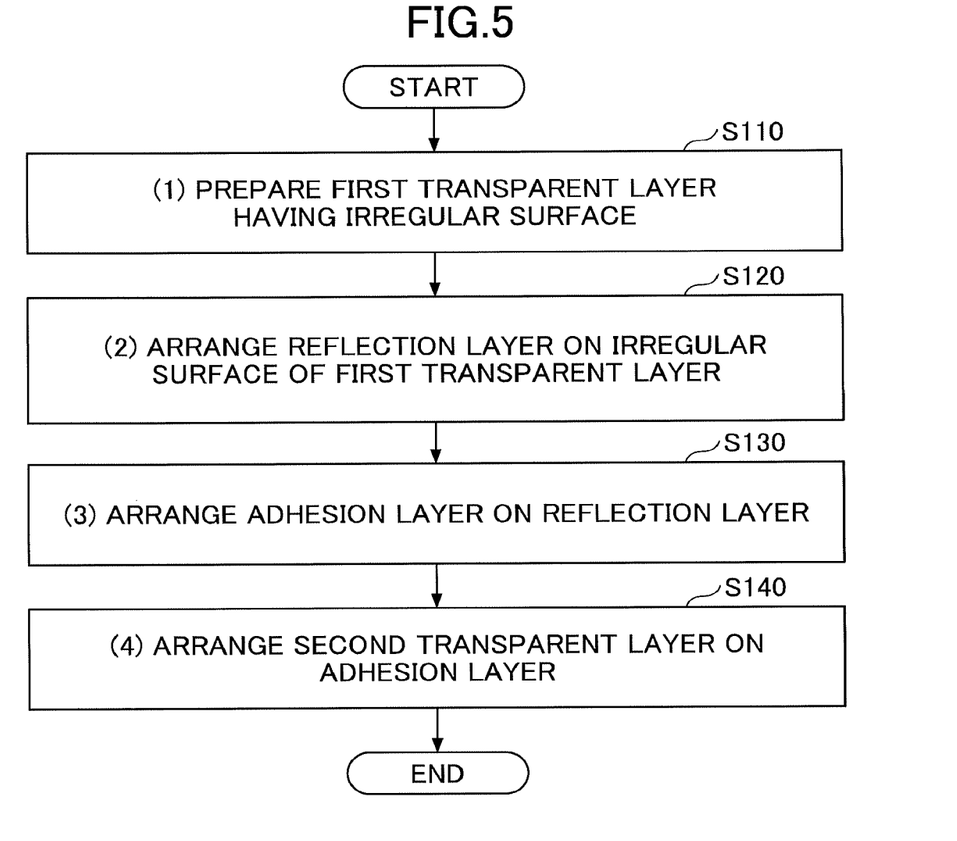
FIG. 5 is a flowchart schematically depicting a manufacturing method of the image projection structure according to the embodiment of the present invention.

FIG. 5 is a flowchart schematically depicting a flow of the manufacturing method of the image projection structure according to the embodiment of the present invention. Moreover, each of FIGS. 6 to 10 schematically depicts a process in the manufacturing method illustrated in FIG. 5.

As illustrated in FIG. 5, the manufacturing method of the image projection structure according to the embodiment of the present application (in the following, referred to as a "first manufacturing method") includes:

(1) A step of preparing a first transparent layer having an irregular surface (step S110);

(2) A step of arranging a reflection layer on the irregular surface of the first transparent layer (step S120);

(3) A step of arranging an adhesion layer on the reflection layer (step S130); and (4) A step of arranging a second transparent layer on the adhesion layer (step S140).

In the following, with reference to FIGS. 6 to 19, each step will be described.

Note that, as an example of the image projection structure, with reference to the first image projection structure 140 having the configuration illustrated in FIG. 2, the manufacturing method thereof will be described. Moreover, in the following explanation, when each of the members is indicated, the reference numeral shown in FIG. 2 will be used.

(Step S110)

The first transparent layer 143 having the irregular surface 151 is prepared. The first transparent layer 143 may be formed on the first support member 141, as illustrated in FIG. 2, for example.

In this case, on the first support member 141, a first resin is arranged. The first resin is preferably a resin that cures by external stimulation (energy application), such as a photosetting resin, a thermosetting resin, or a thermoplastic resin.

A method of arranging the first resin is not particularly limited. The first resin may be arranged on the first support member 141 by using, for example, a die coating method, a spin coating method, an ink jet application method, or a spray coating method.

Figure 6:
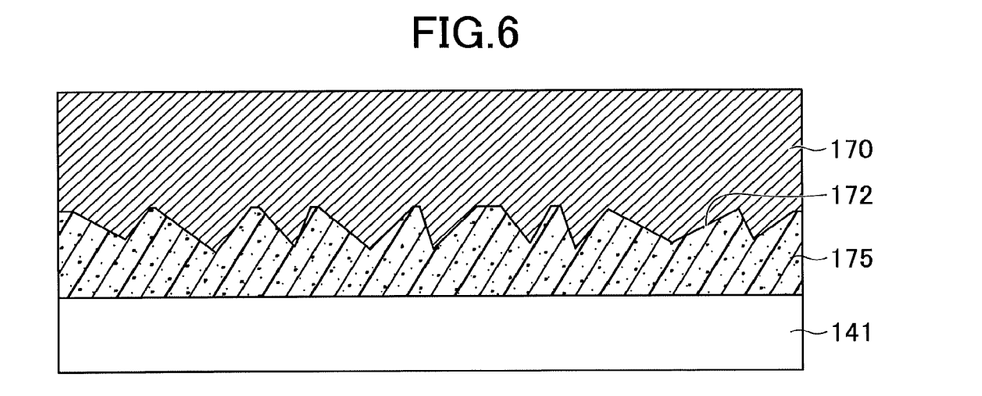
FIG. 6 is a diagram schematically depicting a process in the manufacturing method of the image projection structure illustrated in FIG. 5.

Next, a shaping mold is arranged on the first resin. FIG. 6 is a diagram schematically depicting a state where the shaping mold is arranged on the first resin on the first support member 141.

As illustrated in FIG. 6, the shaping mold 170 has an irregular surface 172. The shaping mold 170 is arranged on the first resin 175 so that the irregular surface 172 contacts the first resin 175. The shaping mold 170 may be, for example, a metal mold, or a film-like member.

Next, in a state where the shaping mold 170 is pressed against the resin 175, an external stimulus, such as an ultraviolet light or heat, is applied to the first resin 175. Thus, the first resin 175 is cured, and the first transparent layer 143 having a surface, on which the irregular surface 172 of the shaping mold 170 was transferred, is formed.

Figure 7:
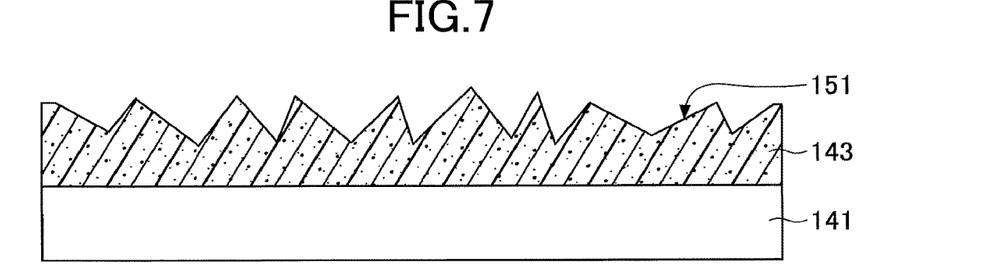
FIG. 7 is a diagram schematically depicting another process in the manufacturing method of the image projection structure illustrated in FIG. 5.

Afterwards, by removing the shaping mold 170, the first transparent layer 143 having the irregular surface 151, as illustrated in FIG. 7, is formed on the first support member 141.

An arithmetic average roughness Ra of the irregular surface 151 falls within a range of, for example, 0.01 µm to 20 µm. Moreover, the maximum PV value of the irregular surface 151 falls within a range of 0.01 µm to 50 µm, and more preferably a range of 0.05 µm to 50 µm.

(Step S120)

Figure 8:
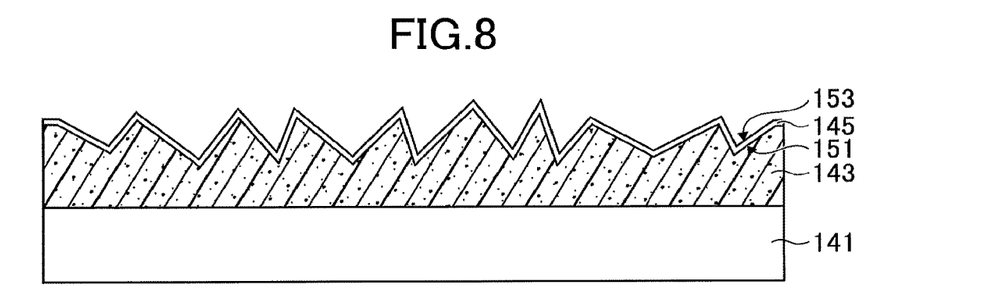
FIG. 8 is a diagram schematically depicting yet another process in the manufacturing method of the image projection structure illustrated in FIG. 5.

Next, as illustrated in FIG. 8, the reflection layer 145 is arranged on the irregular surface 151 of the first transparent layer 143.

A method of arranging the reflection layer 145 is not particularly limited. The reflection layer 145 may be arranged on the first transparent layer 143 by using a deposition technology, such as a vapor deposition method, a physical vapor film deposition (PVD) method, and a sputtering method.

A material of the reflection layer 145 may include, as described above, a metal (including alloy), a metal oxide, a metal nitride, and a combination thereof. Moreover, the reflection layer 145 may be configured with a multilayered film. Moreover, the material of the reflection layer 145 may include a semiconductor.

A thickness of the reflection layer 145 falls, for example, within a range of 1 nm to 150 nm, more preferably 1 nm to 20 nm. Because the reflection layer 145 is relatively thin, an uppermost surface 153 of the reflection surface 145 is an irregular surface that reflects a shape of the irregular surface 151 of the first transparent layer 143 that is below the reflection layer 145.

(Step S130)

Figure 9:
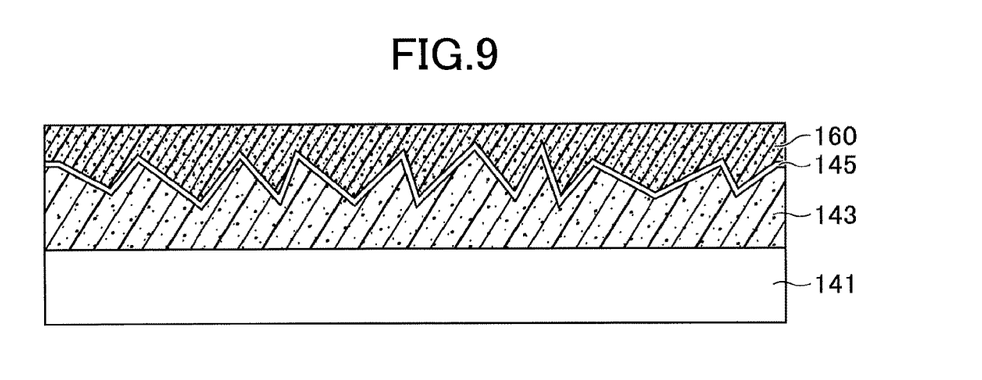
FIG. 9 is a diagram schematically depicting still another process in the manufacturing method of the image projection structure illustrated in FIG. 5.

Next, as illustrated in FIG. 9, the adhesion layer 160 is arranged on the reflection layer 145.

As described above, the adhesion layer 160 is configured of linear polymers. The adhesion layer 160 may be configured of a resin selected from an acrylic resin, a polyester resin, a polyurethane resin, a polyurethane acrylate resin, an ester resin, a polycarbonate resin, a polyvinyl butyral resin, a cycloolefin resin, a cycloolefin copolymer resin, a vinyl acetate copolymer resin and the like. Regarding a molecular weight of the material configuring the adhesion layer 160, a number average molecular weight (Mn) of the material falls within a range from 1000 to 1000000. A glass transition temperature (Tg) of the material configuring the adhesion layer 160 preferably falls within a range from 40° C. to 150° C. When the glass transition temperature (Tg) is lower than 40° C., the adhesion layer 160 cannot withstand high temperature and high pressure upon joining the first support member and the second support member, and an exfoliation occurs. When the glass transition temperature (Tg) is higher than 150° C., the adhesiveness to the reflection layer 145 is poor, and it is not preferable.

A method of forming the adhesion layer 160 is not particularly limited.

For example, the adhesion layer 160 may be formed by applying on the reflection layer 145 an application liquid, which is obtained by dissolving or suspending the aforementioned material in a proper solvent, to form a coating layer, and afterwards volatilizing the solvent components from the coating layer. According to the method, the mold shrinkage factor of the adhesion layer 160 can be made quite small.

The solvent is not particularly limited as long as the solvent dissolves the material configuring the adhesion layer 160 and is easily dried. The solvent may be, for example, an alcohol, an acetone, a methyl ethyl ketone, an ethyl acetate, and a toluene. Moreover, the volatilization of the solvent components may be performed by heating the coating layer. In this case, the heat treatment temperature may fall within, for example, a range from 50° C. to 150° C.

Alternatively, the adhesion layer 160 may be formed by arranging a monomer before reaction on the reflection layer 145, and polymerizing the monomer.

A thickness of the adhesion layer 160 falls within a range from 0.01 mm to 10 mm. In this case, recessed portions on the uppermost surface 153 of the reflection layer 145 are completely filled by the adhesion layer 160. As a result, an upper part of the adhesion layer 160 has a relatively smooth surface.

Note that, as described above, in the case where the adhesion layer 160 is made thin so that the adhesion layer 160 does not fill the recessed portions on the uppermost surface 153 of the reflection layer 145 completely, an adhesion layer 260 having an irregular surface 265, as illustrated in FIG. 3, can be formed.

As described above, the adhesion layer 160 has a relatively small mold shrinkage factor. Thus, a possibility, where an exfoliation occurs between the adhesion layer 160 and the reflection layer 145, is suppressed significantly.

(Step S140)

Figure 10:
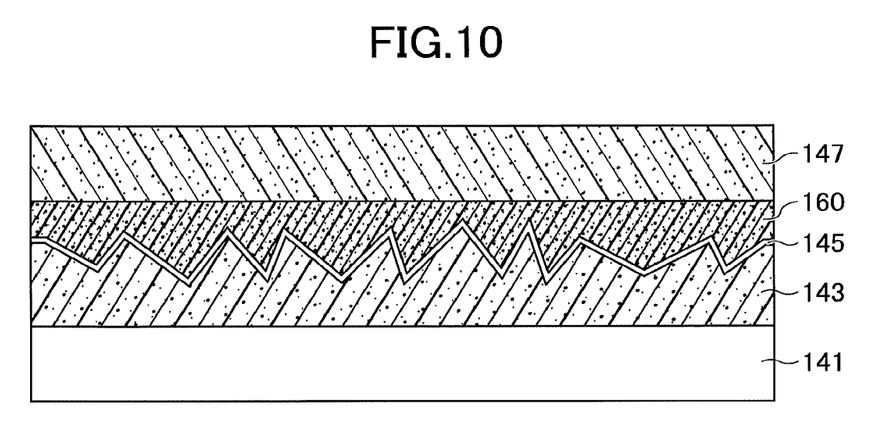
FIG. 10 is a diagram schematically depicting yet another process in the manufacturing method of the image projection structure illustrated in FIG. 5.

Next, as illustrated in FIG. 10, the second transparent layer 147 is arranged on the adhesion layer 160.

The second transparent layer 147 is formed by arranging a second resin on the adhesion layer 160, and causing the second resin to cure.

The second resin is selected from the resins that can form the second transparent layer 147 according to the cross-linking reaction. For example, the second resin may be selected from an ultraviolet curable resin having unsaturated groups, a thermosetting resin or a thermoplastic resin, an epoxy resin, and a silicone resin.

A method of arranging the second resin is not particularly limited. The second resin may be arranged on the adhesion layer 160 by using, for example, a die coating method, a spin coating method, an ink jet application method, or a spray coating method.

Afterwards, by causing the second resin to cure, the second transparent layer 147 is formed on the adhesion layer 160.

At this time, the second support member 149 is preferably arranged on the second transparent layer 147. Moreover, after the second resin is caused to cure, the second support member 149 may be removed, in the case where the second support member 149 is not required.

According to the above-described processes, an image projection structure, such as the first image projection structure 140, illustrated in FIG. 2, can be manufactured.

As described above, in the first manufacturing method, at the step S140, when the second transparent layer 147 is formed by causing the second resin to cure, even if a volume reduction occurs due to the cross-linking reaction, the influence can be mitigated by the adhesion layer 160.

Thus, in the first manufacturing method, an exfoliation between the reflection layer 145 and the second transparent layer 147 can be prevented from occurring significantly.

EXAMPLES

Next, practical examples of the present invention will be described.

Example 1

According to the following method, an image projection structure, and further a transparent screen were manufactured.

As the first support member, a PET film with a thickness of 0.075 mm was prepared. Moreover, as the shaping mold, a sandblast film having random irregular shapes formed on a surface was prepared. An arithmetic average roughness Ra of the irregular shapes of the sandblast film was about 0.2 µm, and a PV value was 1.8 µm.

Next, a first resin was applied on the PET film by using a die coating method. The first resin was a UV curable resin configured of molecules each including two functional groups. The first resin was an acrylic resin.

Next, on the first resin, the aforementioned shaping mold was arranged. The shaping mold was arranged so that a surface of the shaping mold, on which irregular shapes were formed, contacted the first resin. In this state, the first resin was irradiated with a UV light with energy of 1000 mJ from a side opposite to the shaping mold, to cause the first resin to cure, and thereby the first transparent layer was formed.

Afterwards, the shaping mold was removed, and the first transparent layer having an irregular surface was obtained on the PET film. A thickness of the first transparent layer was about 5 µm.

Next, the reflection layer was arranged on the irregular surface of the first transparent layer, by using a sputtering method. The reflection layer included a layer of a silver (Ag)-gold (Au) alloy. A thickness of the reflection layer was 15 nm.

Next, a resin for an adhesion layer was arranged on the reflection layer, by using a die coating method. The resin for the adhesion layer mainly included a polyester resin composed of a dicarboxylic acid and a diol, and included linear polymers with a glass transition temperature of 47° C.

Afterwards, a heating treatment was performed for five minutes, to volatilize a diluent solvent. Thus, the adhesion layer was formed. A mold shrinkage factor of the adhesion layer was less than 3%. A thickness of the adhesion layer was 1.5 µm.

Next, a second resin was applied on the adhesion layer by using a die coating method. The second resin was a UV curable resin configured of molecules each including two functional groups. The second resin was an acrylic resin (acrylic equivalent was 152 g/eq).

In this state, the second resin was irradiated with a UV light with energy of 1000 mJ from a side of the second resin, to cause the second resin to cure, and thereby the second transparent layer was formed. A mold shrinkage factor of the second transparent layer was about 10%. A thickness of the second transparent layer was about 5 µm.

According to the above-described method, an image projection structure (in the following, referred to as an "image projection structure according to example 1") was manufactured.

Next, according to the following method, a transparent screen was manufactured using the image projection structure according to example 1.

Soda lime glasses with thicknesses of 2 mm were prepared for the first and second transparent substrates. Moreover, PVB films with thicknesses of 0.38 mm were prepared for the first and second bonding layers.

Next, the first transparent substrate, the first bonding layer, the image projection structure according to example 1, the second bonding layer, and the second transparent substrate were laminated in this order, to configure a laminated body.

Next, the laminated body was heated at 120° C. for one hour under a vacuum environment. Thus, the transparent screen (in the following, referred to as a "transparent screen according to example 1") was manufactured.

Example 2

By using the same method as in example 1, an image projection structure and a transparent screen were manufactured (in the following, referred to as an "image projection structure according to example 2" and a "transparent screen according to example 2").

However, in example 2, for the reflection layer, a multi-layered film having a three layer structure of titanium (Ti) doped zinc oxide film/silver-bismuth-neodymium alloy (Ag-BiNd) film/titanium (Ti) doped zinc oxide film was used. A total thickness of the reflection layer was about 65 nm.

Moreover, in example 2, for the adhesion layer, a polyvinyl butyral (PVB) was used. A mold shrinkage factor of the adhesion layer was less than 3%. Moreover, a thickness of the adhesion layer was 3.0 µm.

Furthermore, in example 2, for the second transparent layer, an acrylic resin with an acrylic equivalent of 135 g/eq was used. A shrinkage factor of the second transparent layer was about 10%. A thickness of the second transparent layer was about 5 µm.

Example 3

By using the same method as in example 1, an image projection structure and a transparent screen were manufactured (in the following, referred to as an "image projection structure according to example 3" and a "transparent screen according to example 3").

However, in example 3, the adhesion layer was absent, and the second transparent layer was arranged directly on the reflection layer.

TABLE 1, in the following, shows a part of the manufacturing conditions for the image projection structures according to examples 1 to 3, as a whole.

TABLE 1

| | reflection layer | adhesion layer | | | | second transparent layer | | | |
|---|---|---|---|---|---|---|---|---|---|
| | | type | resin structure | shrinkage factor (%) | film thickness (μm) | type | acrylic equivalent | shrinkage factor (%) | film thickness (μm) |
| ex. 1 | AgAu | polyester | linear | less than 3 | 1.5 | 2 functional groups/ UV curable resin | 152 | 10 | 5 |
| ex. 2 | Ti doped ZnO/ AgBiNd/ Ti doped ZnO | PVB | linear | less than 3 | 3.0 | 2 functional groups/ UV curable resin | 135 | 10 | 5 |
| ex. 3 | AgAu | — | — | — | — | 2 functional groups/ UV curable resin | 152 | 10 | 5 |

(Evaluation)

Using the transparent screens according to examples 1 to 3, following evaluations were performed.

(Measurement of Total Light Transmittance and Diffusion Reflectance)

A total light transmittance and a diffusion reflectance of each of the transparent screens according to example 1 to example 3 were measured by using a spectroscopic photometer. Each of the measurements conformed to JIS Z8720: 2012 and was performed using a D65 light source.

(Measurement of Haze)

A haze of each of the transparent screens according to example 1 to example 3 was measured. The measurement was performed using a haze meter conforming to JIS K713 and using a D65 light source described in JIS Z8720:2012.

(Measurement of Adhesiveness)

Adhesiveness was evaluated for the transparent screens according to examples 1 to 3. The evaluation of adhesiveness was performed by using a 90 degrees peeling test conforming to JIS K6854.

However, in the present test, different from the method described in JIS K6854, a width of a sample for measurement was 25 mm, and a length of the sample was 100 mm. Moreover, the present test was performed for five samples for each of the examples 1 to 3, and the adhesiveness was obtained by averaging results of the five samples.

(Exfoliation Test)

An exfoliation test was performed for the transparent screens according to examples 1 to 3. In the exfoliation test, samples were maintained for 1000 hours under a high-temperature and high-humidity environment of 80° C. and 95% relative humidity, and afterwards an exfoliation status of the extracted samples was observed by using an optical microscope.

As a result of the observation, a sample in which an exfoliation could not be found in any of the interfaces is shown in TABLE 2 by "excellent", and a sample in which an exfoliation was found in any of the interfaces is shown in TABLE 2 by "poor".

TABLE 2, in the following, shows results of the evaluation for the image projection structures according to examples 1 to 3, as a whole.

TABLE 2

| | total light transmittance (%) | diffusion reflectance (%) | haze (%) | adhesiveness (N) | result of exfoliation test |
|---|---|---|---|---|---|
| example 1 | 50.9 | 26 | 4.6 | 0.29 | excellent |
| example 2 | 74.8 | 5.5 | 2.2 | 0.14 | excellent |
| example 3 | 48.8 | 25.4 | 5.0 | 0.04 | poor |

From TABLE 2, it is found that in the transparent screens according to examples 1 and 2, compared with the transparent screen according to example 3, the adhesiveness was enhanced significantly. Moreover, it is also found that in the transparent screens according to examples 1 and 2, even after the exfoliation test for 1000 hours, an exfoliation did not occur.

In this way, it was confirmed that by arranging the adhesion layer between the reflection layer and the second transparent layer, an exfoliation between the reflection layer and the second transparent layer was prevented from occurring.

(Other Property)

Furthermore, by using the following method, a chloride ion concentration contained in the resin used for the adhesion layer in example 1 was measured.

The UV curable resin was burned in an automatic sample-burning device, and a generated gas was caused to be absorbed into a liquid containing an aqueous solution of sodium hydroxide (NaOH), hydrogen peroxide ($H_2O_2$) and internal standard phosphate ions $PO_4^{2-}$. Chloride ions and internal standard phosphate ions $PO_4^{2-}$ in the absorbent liquid were quantitated by using an ion chromatography. Due to an upper limit of a quantity of sample that can be burned in one operation, the sample of about 30 mg was divided into four pieces, the burning operation was repeated four times, and generated gas was caused to be absorbed into the same absorbent liquid. For the automatic sample-burning device, AQF-100 by Mitsubishi Chemical Analytech Co., Ltd. was used. For the ion chromatography, Dionex ICS-2100 by Thermo Fisher Scientific K. K. was used.

As a result of the measurement, a concentration of chlorine contained in the resin for adhesion layer used in example 1 was less than a measurement limit (10 μg/g). Thus, it is found that the resin for adhesion layer used in example 1 does not include chloride ions substantially.

Examples 4 to 8

By using the same method as in example 2, image projection structures and transparent screens were manufactured (in the following, referred to as "image projection structures according to examples 4 to 8" and "transparent screens according to examples 4 to 8").

However, in examples 4 to 8, for the reflection layer and/or the adhesion layer, materials different from those in example 2 were used. Moreover, in example 8, for the second transparent layer, a mixture, in which 10 wt % of a silane coupling agent, 3-acryloxypropyltrimethoxysilane (KBM-5103 by Shin-Etsu Chemical Co., Ltd.), was mixed in a UV curable resin with two functional groups (the silane coupling agent of 10 g was mixed into a UV curable resin with two functional groups of 100 g), was used.

TABLE 3, in the following, shows a part of the configuration of the image projection structures according to examples 4 to 8, as a whole.

(Evaluation of Water Absorption Rate)

By using the following method, in each of the image projection structures according to examples 4 to 8, an amount of water contained in the resin used for the adhesion layer was measured.

The image projection structure was immersed in a dilution solvent, and the adhesion layer was dissolved. Next, by using a casting process, the solution of the adhesion layer was moved into an aluminum cup. Afterwards, the cup was heated for five minutes at 110° C., to remove the dilution solvent.

Afterwards, a solid body was extracted. The solid body had a shape of a self-supporting film.

From the self-supporting film obtained as above, a sample for evaluation of 1 g was extracted. Moreover, an amount of water in the sample was measured by using a Karl Fisher

TABLE 3

| | | adhesion layer | | | | second transparent layer | | |
|---|---|---|---|---|---|---|---|---|
| | reflection layer | type | resin structure | shrinkage factor (%) | film thickness (µm) | type | acrylic equivalent | shrinkage factor (%) | film thickness (µm) |
| ex. 4 | Al | acrylic polyol | 3 functional groups/ thermosetting resin | 15 | 1 | 2 functional groups/UV curable resin | 135 | 10 | 5 |
| ex. 5 | Al | cycloolefin | linear | less than 3 | 2 | 2 functional groups/UV curable resin | 135 | 10 | 5 |
| ex. 6 | AgBiNd/ Ti doped ZnO | PVB | linear | less than 3 | 1.5 | 2 functional groups/UV curable resin | 135 | 10 | 5 |
| ex. 7 | AgBiNd/ Ti doped ZnO | cycloolefin | linear | less than 3 | 2 | 2 functional groups/UV curable resin | 135 | 10 | 5 |
| ex. 8 | $SiO_2$/Al/ $SiO_2$ | cycloorefin | linear | less than 3 | 2 | 2 functional groups/UV curable groups + KBM5103 | 135 | 10 | 5 |

(Evaluation)

Using the transparent screens according to examples 4 to 8, the aforementioned evaluations were performed. Moreover, for each sample after the aforementioned exfoliation test, the following evaluations were performed.

(External Observation)

A discolored state of each sample after the exfoliation test was visually observed. As a result of the observation, a sample in which a discoloration did not occur is shown in TABLE 4 by "excellent", and a sample in which a discoloration was found is shown in TABLE 4 by "poor".

apparatus (CA-200 Moisture meter, by API Corporation). Using the amount of water, obtained as above, the water absorption rate of the upper layer was obtained by the relation: (water absorption rate)(%)=(amount of water)× 100/(mass of sample).

TABLE 4, in the following, shows results of the evaluation for the image projection structures or the transparent screens according to examples 4 to 8, as a whole.

TABLE 4

| | total light transmittance (%) | diffusion reflectance (%) | haze (%) | adhesiveness (N) | result of exfoliation test | water absorption rate (%) | external observation |
|---|---|---|---|---|---|---|---|
| example 4 | 39 | 15 | 6 | 0.06 | Poor | 0.8 | poor |
| example 5 | 40 | 13.2 | 6.1 | 0.3 | excellent | 0.005 | excellent |
| example 6 | 70.4 | 7.8 | 2.6 | 0.14 | excellent | 1 | poor |
| example 7 | 71.6 | 6.7 | 3.8 | 0.54 | excellent | 0.005 | excellent |
| example 8 | 39.8 | 13.5 | 10 | 2 | excellent | 0.005 | excellent |

From TABLE 4, it is found that in the transparent screens according to examples 5 to 8, compared with the transparent screen according to example 4, the adhesiveness was enhanced significantly. In particular, it was also found that in the transparent screens according to examples 5 and 8, even after the exfoliation test for 1000 hours, an exfoliation did not occur.

Furthermore, in the transparent screen according to example 8, in which a silane coupling agent was added to the transparent layer, the adhesiveness was found to be greatly enhanced.

In this way, it was confirmed that by arranging the adhesion layer between the reflection layer and the second transparent layer, an exfoliation between the reflection layer and the second transparent layer was prevented from occurring.

Moreover, it was found that in the transparent screen according to examples 4 and 6, discoloration occurred after the exfoliation test. It is presumed that the discoloration was caused by deterioration of reflectivity. It was also found that in the transparent screens according to examples 5 and 7, discoloration did not occur after the exfoliation test.

Thus, it was confirmed that the reflection layer can be prevented from deteriorating by using the adhesion layer having the water absorption rate of less than 0.8%.

As described above, embodiments and the like of the transparent screen have been described. The present invention is not limited to the embodiments or the like. Various variations and enhancements may be made without departing from the scope of the present invention.

REFERENCE SIGNS LIST 1 conventional transparent screen
10 first glass substrate
20 second glass substrate
30 first bonding layer
32 second bonding layer
40 image projection structure
41 first support member
43 first transparent resin layer
45 reflection layer
47 second transparent layer
49 second support member
51 irregular surface
53 uppermost surface
140 first image projection structure
141 first support member
143 first transparent layer
145 reflection layer
147 second transparent layer
149 second support member
151 irregular surface
153 uppermost surface
160 adhesion layer
170 shaping mold
172 irregular surface (of shaping mold)
175 first resin
240 second image projection structure
241 first support member
243 first transparent layer
245 reflection layer
247 second transparent layer
249 second support member
251 irregular surface (of first transparent layer)
253 uppermost surface
260 adhesion layer
265 irregular surface (of adhesion layer)
400 first transparent screen
410 first transparent substrate
420 second transparent substrate
430 first bonding layer
432 second bonding layer
440 image projection structure
P1,P2 interface
P101 first interface
P102 second interface
P103 third interface
P201 first interface (irregular surface of first transparent layer)
P202 second interface (irregular surface of reflection layer)
P203 third interface

What is claimed is:

1. An image projection structure comprising:
a first transparent layer having an irregular surface;
a reflection layer arranged on the irregular surface of the first transparent layer;
an adhesion layer arranged on the reflection surface; and
a second transparent layer arranged on the adhesion layer,
wherein the adhesion layer is configured of linear polymers with a mold shrinkage factor of less than 3%, and
wherein the second transparent layer is configured of a resin having a cross-linking structure.

2. The image projection structure according to claim 1, wherein a cure shrinkage factor of the resin having the cross-linking structure is 3% or more.

3. The image projection structure according to claim 1, wherein the adhesion layer includes a material selected from a group including an acrylic resin, a polyester resin, a polyurethane resin, a polyurethane acrylate resin, a polycarbonate resin, a polyvinyl butyral resin, a cycloolefin resin polymer, a cycloolefin copolymer resin, and an ethylene-vinyl acetate copolymer resin.

4. The image projection structure according to claim 1, wherein a water absorption rate of the adhesion layer is less than 0.8%.

5. The image projection structure according to claim 1, wherein an average molecular weight of the adhesion layer falls within a range from 1000 to 1000000.

6. The image projection structure according to claim 1, wherein the adhesion layer does not include chloride ions substantially.

7. The image projection structure according to claim 1, wherein a surface of the reflection layer on the adhesion layer side has an irregular shape that is conformal with the irregular surface of the first transparent layer.

8. The image projection structure according to claim 7, wherein a surface of the adhesion layer on the second transparent layer side is smoother than a surface of the adhesion layer on the first transparent layer side.

9. The image projection structure according to claim 1, wherein a thickness of the adhesion layer falls within a range from 0.1 μm to 10 μm.

10. The image projection structure according to claim 1, wherein the reflection layer includes a material selected from a group including a metal, a metal oxide, a metal nitride and a semiconductor.

11. The image projection structure according to claim 1, wherein an arithmetic average roughness Ra of the irregular surface of the first transparent layer is 0.01 μm or more and 20 μm or less, and a maximum PV value of the irregular surface is 0.1 μm or more and 50 μm or less.

12. The image projection structure according to claim 1, wherein the second transparent layer is configured of a material selected from a group including a photosetting resin, and a thermosetting resin.

13. The image projection structure according to claim 1, wherein the second transparent layer includes a silane coupling agent of 0.5 wt % to 15 wt %.

14. The image projection structure according to claim 1 further comprising:
at least one of a first support member arranged on a surface of the first transparent layer on a side opposite to the irregular surface, and
a second support member arranged on a surface of the second transparent layer on a side opposite to the adhesion layer.

15. The image projection structure according to claim 14, wherein a transmittance of the image projection structure falls within a range from 30% to 85%, and
wherein a haze of the image projection structure falls within a range from 1% to 15%.

16. The image projection structure according to claim 14, wherein a transmittance of the image projection structure falls within a range from 0.1% to 10%, and
wherein a haze of the image projection structure is 30% or more.

17. A transparent screen comprising:
at least one transparent substrate; and
an image projection structure arranged on a surface of the transparent substrate,
wherein the image projection structure is the image projection structure according to claim 1.

18. A manufacturing method of an image projection structure comprising:
a step (1) of preparing a first transparent layer having an irregular surface;
a step (2) of arranging a reflection layer on the irregular surface of the first transparent layer;
a step (3) of coating a coating liquid, in which linear polymers are dissolved in a solvent on the reflection layer, to form a coating layer, and afterwards vaporizing the solvent from the coating layer, to form an adhesion layer configured of the linear polymers; and
a step (4) of arranging on the adhesion layer a second transparent layer configured by curing a curable resin composition that forms a cross-linking structure.

19. The manufacturing method according to claim 18, wherein the step (1) includes
a step (1-1) of arranging a first resin on a first support member;
a step (1-2) of arranging a shaping mold having an irregular surface on the first resin so that the irregular surface is brought into contact with the first resin; and
a step (1-3) of curing the first resin.

20. The manufacturing method according to claim 18, wherein a surface of the adhesion layer on the second transparent layer side is smoother than a surface of the adhesion layer on the first transparent layer side.

* * * * *